(12) United States Patent
Coleman et al.

(10) Patent No.: US 7,038,735 B2
(45) Date of Patent: May 2, 2006

(54) VIDEO DISPLAY SYSTEM UTILIZING GAMMA CORRECTION

(75) Inventors: Terrence J. Coleman, Federal Way, WA (US); Kenneth C. George, Bluffdale, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 595 days.

(21) Appl. No.: 10/039,208

(22) Filed: Jan. 4, 2002

(65) Prior Publication Data

US 2003/0128299 A1 Jul. 10, 2003

(51) Int. Cl.
*H04N 5/202* (2006.01)

(52) U.S. Cl. ..................................................... 348/674

(58) Field of Classification Search ................ 348/674, 348/675, 676, 677; H04N 5/202, 5/69
See application file for complete search history.

(56) References Cited

U.S. PATENT DOCUMENTS

| | | | |
|---|---|---|---|
| 4,799,106 A * | 1/1989 | Moore et al. ............... 348/619 |
| 5,473,373 A * | 12/1995 | Hwung et al. ............... 348/254 |
| 6,262,810 B1 | 7/2001 | Bloomer | |
| 6,292,165 B1 | 9/2001 | Lin et al. | |
| 6,292,268 B1 | 9/2001 | Hirota et al. | |
| 6,433,823 B1 * | 8/2002 | Nakamura et al. .......... 348/254 |
| 6,433,838 B1 * | 8/2002 | Chen .......................... 348/674 |

* cited by examiner

*Primary Examiner*—Michael H. Lee
(74) *Attorney, Agent, or Firm*—Thorpe North & Western LLP

(57) ABSTRACT

A method and system are disclosed that correct pixel values for output on a video display utilizing gamma correction. The method provides improved gamma correction by determining a first range of pixel values to be displayed on the video display and then determining a second range of pixel values to be displayed on the same display. Next, the method determines a first level of gamma correction to be provided for the first range of pixel values. This first level of gamma correction is provided at a first level of precision. Next, the method provides a second level of gamma correction to the second range of pixel values at a second level of precision. The second level of precision is different than that of the first level and is typically less than the first level.

24 Claims, 5 Drawing Sheets

| Pixel Value | Color Value (PixelValue/4095) | Ideal Gamma Corrected Color Value | Output of Lower Gamma Table | Output of Lower Gamma Table / 1023 | Output of Upper Gamma Table | Output of Upper Gamma Table / 1023 | Error |
|---|---|---|---|---|---|---|---|
| 0 | 0.000000 | .0000 | 0 | 0.000000 | | | 0.000000 |
| 1 | 0.000244 | .0227 | 23 | 0.022483 | | | - 0.000217 |
| 2 | 0.000488 | .0312 | 32 | 0.031281 | | | 0.000081 |
| . | . | . | . | . | | | . |
| 255 | 0.062271 | .2831 | 290 | 0.283480 | | | 0.000380 |
| 256 | 0.062515 | .2835 | | | 294 | 0.287390 | 0.003890 |
| 257 | 0.062759 | .2841 | | | 294 | 0.287390 | 0.003290 |
| 258 | 0.063004 | .2846 | | | 294 | 0.287390 | 0.002790 |
| 259 | 0.063248 | .2851 | | | 294 | 0.287390 | 0.002290 |
| 260 | 0.063492 | .2856 | | | 294 | 0.287390 | 0.001790 |
| 261 | 0.063736 | .2861 | | | 294 | 0.287390 | 0.001290 |
| 262 | 0.063980 | .2866 | | | 294 | 0.287390 | 0.000790 |
| 263 | 0.064225 | .2871 | | | 294 | 0.287390 | 0.000290 |
| 264 | 0.064469 | .2876 | | | 294 | 0.287390 | - 0.000210 |
| 265 | 0.064713 | .2880 | | | 294 | 0.287390 | - 0.000610 |
| 266 | 0.064957 | .2885 | | | 294 | 0.287390 | - 0.001110 |
| 267 | 0.065201 | .2890 | | | 294 | 0.287390 | - 0.001610 |
| 268 | 0.065446 | .2895 | | | 294 | 0.287390 | - 0.002110 |
| 269 | 0.065690 | .2900 | | | 294 | 0.287390 | - 0.002610 |
| 270 | 0.065934 | .2905 | | | 294 | 0.287390 | - 0.003110 |
| 271 | 0.066178 | .2910 | | | 294 | 0.287390 | - 0.003610 |
| 272 | 0.066422 | .2915 | | | 302 | 0.295210 | 0.003710 |
| . | . | . | | | . | . | . |
| 287 | 0.070085 | .2987 | | | 302 | 0.295210 | - 0.003490 |

FIG. 3

VIDEO DISPLAY SYSTEM UTILIZING GAMMA CORRECTION

BACKGROUND OF THE INVENTION

The present invention relates generally to video display systems and output sources and, more particularly, the present invention relates to correcting display and output features using gamma correction for such occasions as for video display or graphics printing.

Computer systems typically include a video display monitor and a printing device attached to the computer system. The computer system includes a graphics signal processor that converts appropriate signals into displayable signals on the video monitor. Further, the computer system is able to generate graphics for printing based on the same signals that are printed on the printer. Video monitors typically display the digital data as an analog image. Thus, there needs to be a conversion process of converting the digital signal into an analog signal. To approximate a digital pattern, the images are divided into arrays of pixel elements that can be stimulated to emit a range of brightness. A particular brightness of light that a pixel emits is called its "value."

Most video monitors, especially cathode grade 2 systems, have a nonlinear transfer characteristic. This means that the CRTs fail to reproduce brightness in a linear fashion, but instead produce it as a nonlinear function of the control grid video drawing. Accordingly, the doubling of voltage applied by the CRT monitors does not double the brightness of the associate pixel. When display graphics are produced on graphics workstations, it is necessary to compensate for this nonlinearity. The compensation of brightness intensity values to produce a linear gradation of brightness intensities in response to a linear range of brightness intensity values is called "gamma correction." Accordingly, a conversion circuit is typically included in a computer system video processor to provide linear response on the graphics monitor and this conversion circuit is typically called a gamma correction circuit.

One method of performing gamma correction on digitized intensity signal is to translate each of the N-bit red, green, and blue (RGB) brightness intensity values to compensated N-bit brightness intensity values using a brightness lookup table (LUT). This LUT is typically stored in a solid state memory, usually in a read-only memory (ROM), and includes a range of brightness intensity values, each of which is associated with a corresponding gamma corrected value. The present ROM gamma correction tables, however, are fixed in gamma values that cannot be changed once the ROM is programmed, so correction updates are impossible without removing the ROM device completely.

One solution is to use a gamma correction LUT stored in random access memory (RAM) for pixel brightness. One disadvantage of this method and apparatus is that RAM brightness LUTs do not allow for data compression. Another disadvantage is that often the level of precision provided by the digital signal processor is greater than that of the actual output device translating the signal into a viewable display. Thus, extra memory utilized to anticipate every color and pixel value requires extra storage capabilities that are lost in the actual display of the pixel values once translated for use for display on the display monitor.

Accordingly, what is needed is a gamma correction system and method that overcomes the limitations of the prior art by placing less demands on memory and providing accurate correction through critical ranges of pixel values to be displayed. Further, the gamma correction should provide a precision level at least comparable with that of the actual display system.

SUMMARY OF THE INVENTION

According to the present invention, a method and system are disclosed that correct pixel values for output on a video display utilizing gamma correction. The method provides improved gamma correction by determining a first range of pixel values to be displayed on the video display and then determining a second range of pixel values to be displayed on the same display. Next, the method determines a first level of gamma correction to be provided for the first range of pixel values. This first level of gamma correction is provided at a first level of precision. Next, the method provides a second level of gamma correction to the second range of pixel values at a second level of precision. The second level of precision is different than that of the first level and is typically less than the first level.

A first level of gamma correction is intended to provide each pixel value with its own gamma correction value within the first range of pixel values. The second level of gamma correction provides a unique gamma correction value for groups of two or more pixel values within the range. Thus, at least two pixel values in the second range share the same gamma correction value. Typically, the first range of pixel values falls within a low light level of input pixel values while the second range extends for pixel values greater than the low light level.

A video processor that utilizes the method is further disclosed. The video processor includes a video signal processor, which is coupled to a gamma correction device, which is further coupled to a digital-to-analog converter (DAC). The gamma correction device also includes a gamma lookup table that includes a first gamma lookup section and a second gamma lookup section. The first gamma lookup section, which also may be characterized as a first gamma lookup table, is programmed to provide a first level of gamma correction to the first range of pixel values. The second gamma lookup section, also known as a second gamma lookup table, is programmed to provide a second level of gamma correction to a second range of pixel values. The first level of gamma correction is performed at the first level of precision while the second level of gamma correction is performed at a second level of precision, typically less than the first level of precision.

In further embodiments, additional ranges besides the first two ranges are provided, which allows for additional levels of precision that may be greater than, equal to or less than the second range of precision. The gamma lookup table may be divided into two separate tables, comprising a first gamma lookup table and a second gamma lookup table, each of which may be constituted in a monolithic memory device. The gamma lookup tables may also be implemented in discrete memory units, depending upon the design of the programmer.

In one embodiment, a table of 4096 pixel values is provided where the first range of pixel values covers pixel values from 0 to 255 and the second range covers values 256 to 4095. Thus, the present invention utilizes a lookup table of 512 gamma correction values to process a complement of 4096 pixel values. Further, it is understood that the video processor processes at least three colors, red, green, and blue for one example, so a gamma lookup table would be provided for each color scheme and a range of values would be provided for each colors scheme as well. Within that range, subranges of a first range and a second range would be defined wherein a first level of gamma correction is provided for the first range and a second level of gamma correction is provided for the second range.

The digital to analog converter is utilized to convert the digital pixel values from the video signal processor to a form usable by a video display. If the video display has a digital input, then the digital to analog converter may be bypassed so that the digital signals may be passed directly to the digital video monitor for display.

BRIEF DESCRIPTION OF THE DRAWINGS

FIG. 3 illustrates a table of color pixel values as corrected by the gamma correction device of FIG. 2;

DETAILED DESCRIPTION OF SPECIFIC EMBODIMENTS

Figure 1:
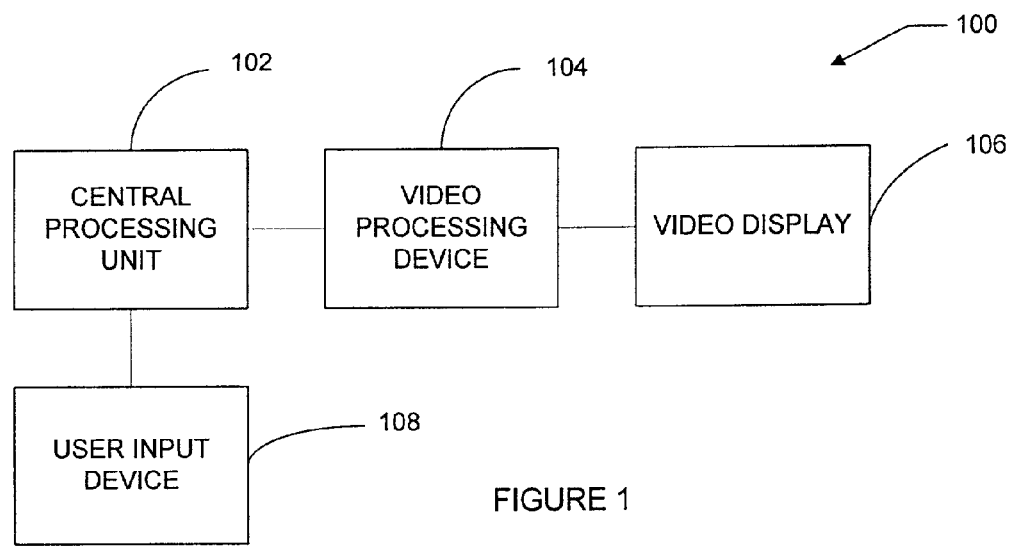
FIG. 1 is a block diagram of a computer system incorporating a video processor in accordance with the present invention.

A computer system 100 is illustrated in the block diagram of FIG. 1. The computer system 100 utilizes a video processing device having a gamma lookup table (LUT) device for performing gamma correction on the color components outputted in the computer system to a video monitor associated therewith. The computer system includes a central processing unit (CPU) 102 to perform the main function of processing data as desired in a particular program loaded within the memory of the computer system. The CPU 102 is configured to include both long-term and short-term memory stores such as read only memory (ROM) and random access memory (RAM) as well as other long-term memory stores such as hard disk drive. Typically, a universal bus (not shown) is utilized to connect the various components to the CPU 102 such as a video processor device 104, which is further connected to a video display device 106. Additional devices such as a user input device 108 may also be connected to the computer system via the bus. Although the system is illustrated to include a video display, another graphics output device, such as a printer, may also be connected to the system to print documents that include graphics. The graphics for printing are managed in a manner similar to the video processing performed by the video processor 104.

The video processor 104 is designed to generate and store color pixel values with up to N-bits of precision. In this example, N is equal to 12, but any number other than 12 is also suitable and can range from as few as 6 bits to as great as 128 bits or more. This precision is necessary to maintain realistic coloration at low light levels. The coloration is less of a problem at higher light levels, so a lower precision than that needed for the low light levels is acceptable. In a video processor providing 12-bit color precision, the processor must include a gamma table having 4096 entries for each of the colors in order to avoid annoying image banding during low light conditions. Typically, the video processor processes three separate colors in the red, green and blue wavelengths, also know as an RGB color scheme.

Since the precision is more important at the lower light levels than at the higher light levels, a compromise may be made to provide a solution that is both reasonable and easy to implement. The present invention provides for a first level of precision of gamma correction for a first range of pixel values while providing a second level of precision for a second range of pixel values. The ranges of precision or the two values of precision are different from one another. One solution is to provide two separate gamma correction LUTs with one covering the first range and the second covering the second range.

For example, through analysis and experimentation it has been learned that the first 256 pixel values require the greatest precision of gamma correction possible. At this low light level corresponding to the first 256 pixel values, the gamma correction is best performed at a one-to-one level where there is a gamma correction value for each pixel value. Thus, for 256 pixel values there are 256 gamma correction values. The remaining pixel values require a lower level of precision and it has been found that a second range of 256 gamma values can be utilized in a step fashion to provide gamma correct for the remaining pixel values within the 4096 pixel value table less the first 256 pixel values. The prior art has typically required a one-to-one correspondence of gamma correction values to pixel values at every level so a gamma LUT having 4096 entries, typically stored in RAM, would be required in a color video processor having 12-bits of precision. The use of a RAM device allows for the gamma correction values to be updated at a later time, as opposed to the use of a ROM, which prevents updating once the ROM is programmed. As there are three color pixel values for each video pixel, each color pixel group requires a separate gamma correction LUT, the processor would require three separate gamma correction LUTs, each having 4096 values to correct each color pixel value on a one to one basis. By contrast, the present invention uses three separate gamma correction LUTs, but each has only 512 values, instead of 4096 as required in the prior art. Each LUT in the present invention is then further divided into two or more defined LUTs of different precision. Accordingly, one advantage of using at least two LUTs with differing precision for application to different ranges is that less memory is required as there are fewer correction values stored than in a single, monolithic gamma correction LUT.

Figure 2:
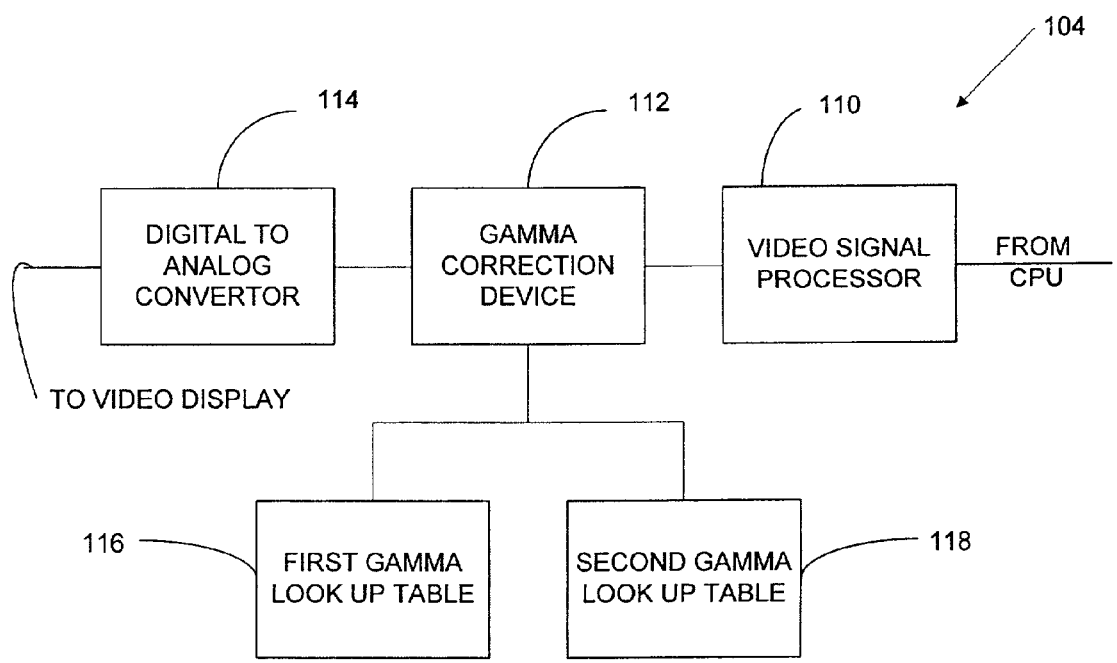
FIG. 2 depicts a schematic diagram of the video processor of FIG. 1 that which includes a gamma correction device in accordance with the present invention.

FIG. 2 illustrates a schematic diagram of the video processor 104. An example of a suitable video processor 104 is commercially available in Real Image 5000, manufactured by Evans & Sutherland, Salt Lake City, Utah. The video processor 104 includes a video signal processor 110, a gamma correction device 112, and a digital to analog converter (DAC) 114. Video signal processor 110 typically is connected to the CPU 102 of FIG. 1 while the DAC 114 has an output connection to the video display 116 of FIG. 1. The gamma correction device 112 connects to the video signal processor 110 and to the DAC 114. The gamma correction device further connects to a plurality of gamma correction LUTs, each having a different level of precision according to a range of pixel values to be corrected as assigned to each of the LUTs.

Once the gamma correction device 112 has performed the gamma correction on the pixel value, the digital values are then forwarded to the DAC 114. DAC 114 provides an appropriate signal to the video display 116 to display the pixel value. DAC systems are well known to those skilled in the art.

In an exemplary embodiment, FIG. 2 discloses two gamma correction LUTs including first gamma LUT 116 and second gamma LUT 118. Although only two look up tables are illustrated for purposes of this invention, it is understood that additional LUTs are contemplated and can provide correction for a different range outside the ranges covered by the first two LUTs. Further, although the invention is described as requiring the ranges not to overlap, it is possible to allow some overlap of correction between two LUTs. Further, although the LUTs are shown to be in separate memory elements, the LUTs may actually be found in a common memory, but divided so that a first portion covers a first range and a second portion covers a second range.

In the example of a video processor having 12-bit video pixel precision, it has been determined that two gamma LUTs having 256 entries each may be implemented to achieve the necessary precision at the lower light levels and reasonable precision for the higher light levels. The first gamma LUT 116 has 256 gamma entries for use where the pixel values range from 0 to 255. The second gamma LUT 118 has a second level of precision and covers the component values ranging from 256 to 4095.

The accuracy calculation of performing gamma correction is performed in accordance with the following equation:

$$GC=C^{**}(1/g)$$

where:

GC=gamma corrected color 0 to 1.0
C=non-gamma corrected color, 0 to 1.0
g=gamma, typically approximately 2.2

A table is shown in FIG. 3, which illustrates the ideal gamma corrected color utilizing the above equation for various pixel values ranging from 0 to 287. When the pixel value ranges from 0 to 255, the lower gamma table is used for producing the output shown in the fourth column of the table. When the pixel value is from 256 to 4095, the upper gamma table is used to produce the output shown in the sixth column of the table.

The last or eighth column shows the difference between the ideal gamma corrected color and the actual gamma corrected color as calculated in gamma correction device 112 utilizing either the first gamma LUT 116 or the second gamma LUT 118. For pixel values less than 256, the maximum error is less than 0.000488 (1/2*1023), which is sufficient precision to drive a 10-bit DAC used as DAC 114. For pixel values greater than or equal to 256, the maximum error is 0.003890, which is equivalent to implementations done with only 256 entries. This level of error is small enough to be unnoticeable by an observer even at low light levels when viewed on the video display.

The table illustrated in FIG. 3 has eight columns. Column one represents the pixel value. Column two represents the color value, which is the pixel value divided by 4095. Column three represents the ideal gamma corrected color value. Column four represents the output of the lower or first gamma table while column five represents the output of the first gamma table divided by 1023. Column six represents the output of the upper or second gamma table. Column seven represents the output of the second gamma table divided by 1023. Column eight represents the actual error value as previously mentioned.

Figure 4:
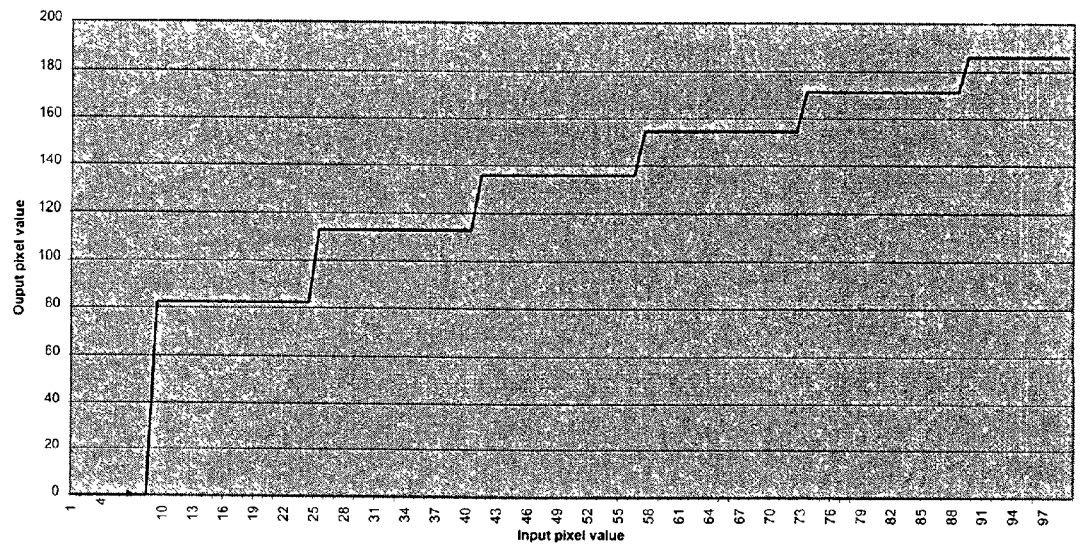
FIG. 4 depicts a graph of pixel values at low level intensity according to the prior art.

A series of graphs are provided to illustrate the gamma curves and the error introduced for three scenarios. The first scenario is that of the prior art having only 256 values for gamma correction entries and is illustrated in the graph of FIG. 4. The video processor produces 4096 input pixel values, but only 256 gamma correction values are provided. Thus, to manage 256 gamma correction values over 4096 input pixel values, a grouping of pixel values is performed where each pixel value in the same group utilizes the same gamma correction value. Accordingly, 256 groups are formed. The graph illustrates a step function consistent with groups of pixel values sharing the same gamma correction value.

Figure 5:
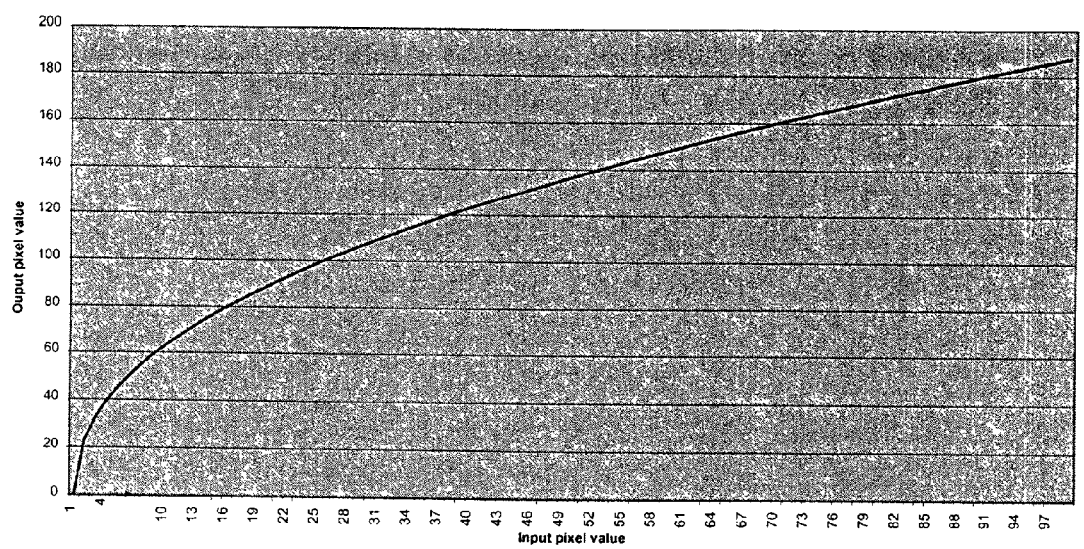
FIG. 5 depicts a graph of pixel values at low level intensity according to the present invention.
Figure 6:
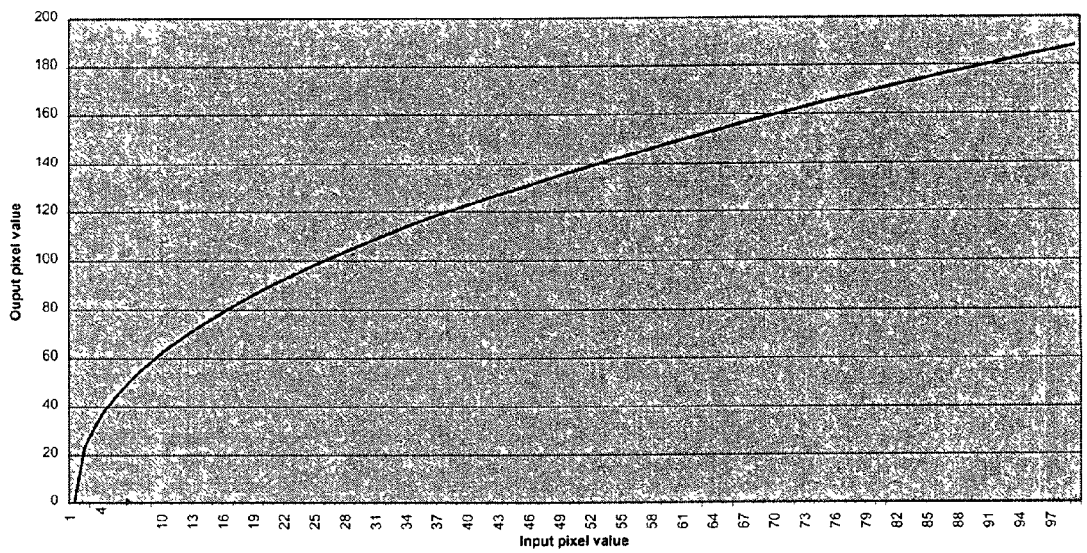
FIG. 6 depicts a graph of pixel values at low intensity level according to the prior art.

By contrast, the graph of FIG. 5 shows how the first 100 values in the 512 entries provided in the present invention yield a curve that is virtually smooth, thereby providing the greatest correction in the first 100 values and extending into the first 256 values. The graph of FIG. 5 is nearly identical to the curve shown in the graph of FIG. 6. FIG. 6 depicts a graph for a system utilizing a gamma correction LUT having 4096 entries.

The first three graphs shown in FIGS. 4–6 illustrate the error at low light levels for the first 100 input values. As shown in FIG. 4, there is a significant error with respect to utilizing only 256 entries where only a few of those entries are used to correct for low light levels. Meanwhile, the invention offers no errors relative to the 4096 entry LUT implementation of FIG. 6 where FIGS. 5 and 6 offer nearly identical curves.

Figure 7:
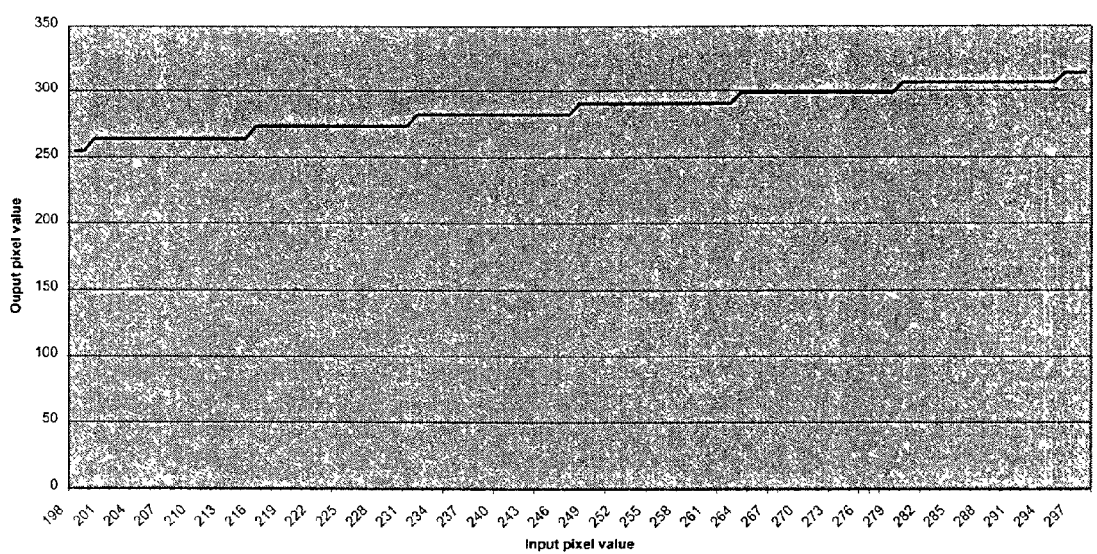
FIG. 7 depicts a graph of pixel values at a higher level of intensity as processed in the prior art.
Figure 8:
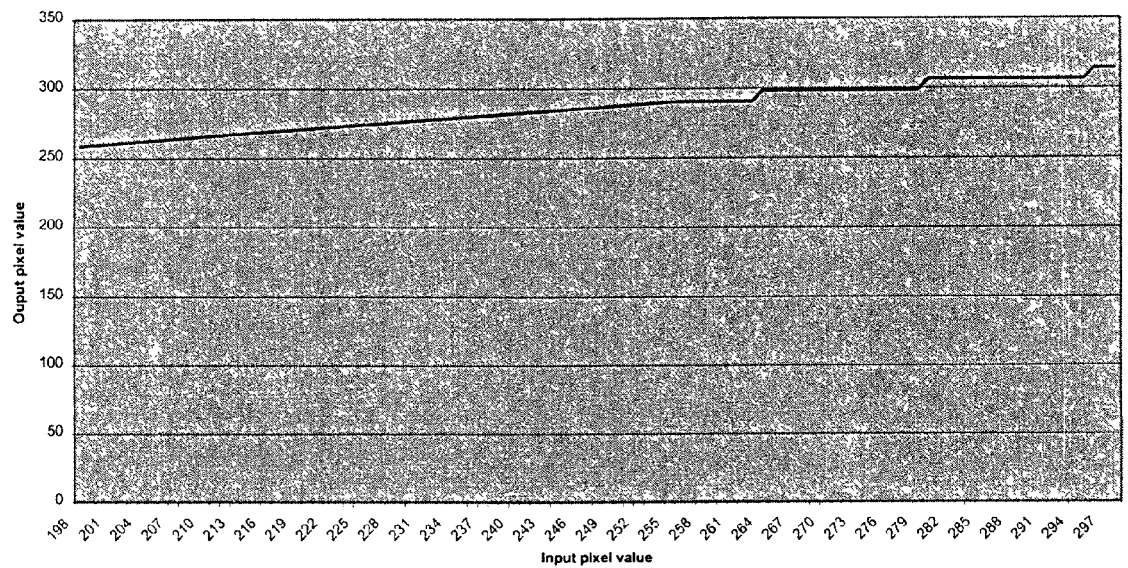
FIG. 8 depicts a graph of pixel values at a higher level of intensity according to the present invention.
Figure 9:
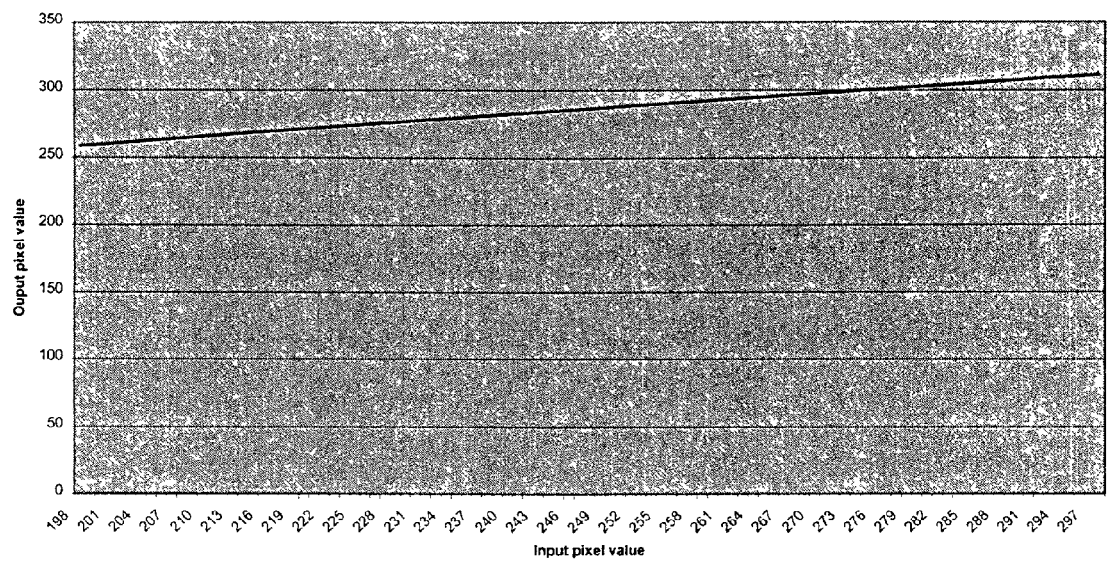
FIG. 9 depicts a graph of pixel values at a higher level of intensity as processed according to the prior art.

FIGS. 7–9 illustrate graphs showing the error transition at the point around pixel value 256. FIG. 7 continues to show the error value for a table having only 256 entries as found in the prior art. FIG. 8 illustrates the error value for the remaining 256 values out of the 512 as implemented according to the present invention. FIG. 9 illustrates the use of a gamma correction LUT having the full complement of 4096 entries. Since the curve begins to flatten out past the 256 entry point, the extent of the error is much less than at the lower intensities and becomes very difficult, if not impossible, to detect in an actual image. While FIG. 7 continues to show a slight step function in groups of pixel values, the error correction illustrated in the graph of FIG. 8 shows a virtual smoothness identical to that FIG. 9. Once the graph of FIG. 8 extends past the first 256 values, a slight step function occurs, much like that of FIG. 7. After this point, the curve of FIG. 8 flattens enough that such error values are not discernible by the user once the pixel values are displayed on the monitor.

It has been demonstrated that a simplified gamma correction system utilizing two look up tables covering a first range and a second range and providing a first precision versus a second precision offers an inexpensive and reliable solution to more complex and expensive solutions found in the art. It is further contemplated that more than two look up tables may be utilized in an attempt to provide a smoother error correction where greater precision is necessary, but where the expense of additional memory prohibits a more comprehensive LUT. Thus, providing entry values for all pixel values versus providing merely "good enough" error correction at the higher light levels tips in favor of "good enough" once the critical areas are well provided for.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts of the invention as set forth in the claims.

The invention claimed is:

1. A method of correcting pixel values for output on a video display utilizing gamma correction, comprising:
   determining a first range of pixel values to be displayed on the video display;
   determining a second range of pixel values to be displayed on the video display;
   providing a first level of gamma correction to the first range of pixel values at a first level of precision; and
   providing a second level of gamma correction to the second range of pixel values at a second level of precision, different than the first level of precision.

2. The method of correcting pixel values for output in accordance with claim 1 wherein the step of providing a first gamma correction includes the step of providing a unique correction value for each pixel within the first range of pixel values.

3. The method of correcting pixel values for output in accordance with claim 1 wherein the step of providing a second level of gamma correction includes the step of utilizing a gamma correction value for at least two pixel values within the second range of pixel values.

4. The method of correcting pixel values for output in accordance with claim 1 further comprising outputting the gamma corrected pixel values of both the first range and the second range to a video display for display.

5. The method of correcting pixel values for output as claimed in claim 4 also comprising converting the outputted gamma corrected pixel values from a digital value to an analog signal for display on the video display.

6. A method of correcting pixel values for output in accordance with claim 1 wherein the step of determining a first range of pixel values includes selecting a first range of pixel values within a low light level of input pixel values.

7. A method of correcting pixel values for output in accordance with claim 1 wherein the step of determining a second range of pixel values comprises selecting a range of pixel values outside a low light level value of pixel values.

8. A method of correcting pixel values for output in accordance with claim 1 wherein the first level of precision is greater than the second level of precision.

9. A video processor comprising:
   a video signal processor;
   a digital to analog converter;
   a gamma correction device, coupled to the video signal processor and the digital to analog converter;
   a first gamma look up table, coupled to the gamma correction device, the first gamma look up table programmed to provide a first level of gamma correction to a first range of pixel values at a first level of precision; and
   a second gamma look up table, coupled to the gamma correction device, the second gamma look up table programmed to provide a second level of gamma correction to a second range of pixel values at a second level of precision, different than the first level of precision.

10. The video processor of claim 9 wherein the first gamma correction look up table provides a unique correction value for each pixel value within the first range of pixel values.

11. The video processor of claim 9 wherein the second gamma correction look up table provides a gamma correction value for at least two pixel values within the second range of pixel values.

12. The video processor of claim 9 further comprising a video display, coupled to the digital to analog converter, wherein the gamma corrected pixel values of both the first range and the second range are sent to the video display for display.

13. The video processor of claim 12 wherein the digital to analog converter converts the outputted gamma corrected pixel values from a digital value to an analog signal for display on the video display.

14. The video processor of claim 9 wherein the first range of pixel values includes those pixel values within a low light level of input pixel values.

15. The video processor of claim 14 wherein the second range of pixel values includes those pixel values outside a low light level value of pixel values.

16. The video processor of claim 9 wherein the first level of precision is greater than the second level of precision.

17. A video processor comprising:
   a video signal processor;
   a digital to analog converter;
   a gamma correction device, coupled to the video signal processor and the digital to analog converter; and
   a gamma look up table, coupled to the gamma correction device, to provide a first level of gamma correction to a first range of pixel values at a first level of precision and a second level of gamma correction to a second range of pixel values at a second level of precision, different than the first level of precision.

18. The video processor of claim 17 wherein the first level of gamma correction provides a unique correction value for each pixel value within the first range of pixel values.

19. The video processor of claim 17 wherein the second level of gamma correction provides a gamma correction value for at least two pixel values within the second range of pixel values.

20. The video processor of claim 17 further comprising a video display, coupled to the digital to analog converter, wherein the gamma corrected pixel values of both the first range and the second range are sent to the video display for display.

21. The video processor of claim 20 wherein the digital to analog converter converts the outputted gamma corrected pixel values from a digital value to an analog signal for display on the video display.

22. The video processor of claim 17 wherein the first range of pixel values includes those pixel values within a low light level of input pixel values.

23. The video processor of claim 22 wherein the second range of pixel values includes those pixel values outside a low light level value of pixel values.

24. The video processor of claim 17 wherein the first level of precision is greater than the second level of precision.

* * * * *